(12) United States Patent
Baker et al.

(10) Patent No.: US 7,050,045 B2
(45) Date of Patent: May 23, 2006

(54) MINIATURE HIGHLY MANUFACTURABLE MOUSE POINTING DEVICE

(75) Inventors: Jeffrey R. Baker, Thousand Oaks, CA (US); Carlos S. Sanchez, Oxnard, CA (US); James D. Tickle, Moorpark, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 434 days.

(21) Appl. No.: 10/337,458

(22) Filed: Jan. 7, 2003

(65) Prior Publication Data

US 2004/0130528 A1 Jul. 8, 2004

(51) Int. Cl.
*G09G 5/08* (2006.01)

(52) U.S. Cl. .................. 345/169; 345/157; 345/161; 341/34; 338/47; 379/433.07

(58) Field of Classification Search ........ 345/156–169; 341/22, 34; 500/5 A, 5 R, 512–517; 379/433.06, 379/433.07; 338/47; 200/5 A, 5 R; 463/37–38
See application file for complete search history.

(56) References Cited

U.S. PATENT DOCUMENTS

| | | | |
|---|---|---|---|
| 4,079,194 A | 3/1978 | Kley | |
| 4,129,747 A | 12/1978 | Pepper, Jr. | |
| 4,296,406 A | 10/1981 | Pearson | |
| 4,314,227 A | 2/1982 | Eventoff | |
| 4,314,228 A | 2/1982 | Eventoff | |
| 4,475,008 A | 10/1984 | Doi et al. | |
| 4,489,302 A | 12/1984 | Eventoff | |
| 4,598,181 A * | 7/1986 | Selby | .......... 200/5 A |
| 4,620,062 A | 10/1986 | Mizzi et al. | |
| 4,623,757 A | 11/1986 | Marino | |
| 4,687,885 A | 8/1987 | Talmage, Jr. et al. | |
| 4,739,299 A | 4/1988 | Eventoff et al. | |
| 4,752,655 A | 6/1988 | Tajiri et al. | |
| 4,798,919 A | 1/1989 | Miessler | |
| 4,810,992 A | 3/1989 | Eventoff | |
| 4,996,511 A | 2/1991 | Ohkawa et al. | |
| 5,008,497 A | 4/1991 | Asher | |
| 5,159,159 A | 10/1992 | Asher | |
| 5,296,837 A | 3/1994 | Yaniger | |
| 5,302,936 A | 4/1994 | Yaniger | |
| 5,357,065 A * | 10/1994 | Mitamura et al. | .......... 200/5 A |
| 5,430,262 A * | 7/1995 | Matsui et al. | ............... 200/5 A |
| 5,539,159 A | 7/1996 | Protheroe et al. | |

(Continued)

FOREIGN PATENT DOCUMENTS

JP 52-56957 5/1977

*Primary Examiner*—Lun-yi Lao
(74) *Attorney, Agent, or Firm*—Brooks Kushman P.C.

(57) ABSTRACT

A pointing device may be directly soldered to a printed circuit board. In one embodiment, a bottom substrate defines a sensing region with a plurality of interdigitated conductive trace regions. Each trace region includes interdigitated common and sense traces. At least one via passes through the bottom substrate for each trace. Each via supports a conductive path from one trace to at least one lead element. Each lead element is solderable to a printed circuit board. A flexible substrate is constructed from a heat resistant polymer. The flexible substrate has a resistive layer deposited on a bottom side. A raised pedestal is formed on the bottom substrate top face around at least a portion of the sensing region. The pedestal separates the interdigitated conductive traces from the flexible substrate resistive layer. A button on a keypad membrane may be used to depress the flexible substrate onto the trace region.

30 Claims, 9 Drawing Sheets

U.S. PATENT DOCUMENTS

| | | | |
|---|---|---|---|
| 5,659,334 | A | 8/1997 | Yaniger et al. |
| 5,828,363 | A | 10/1998 | Yaniger et al. |
| 5,942,733 | A | 8/1999 | Allen et al. |
| 5,943,044 | A | 8/1999 | Martinelli et al. |
| 5,989,700 | A | 11/1999 | Krivopal |
| 6,087,925 | A | 7/2000 | DeVolpi |
| 6,102,802 | A | 8/2000 | Armstrong |
| 6,115,030 | A * | 9/2000 | Berstis et al. ............... 345/161 |
| 6,121,869 | A | 9/2000 | Burgess |
| 6,137,475 | A | 10/2000 | Ginn et al. |
| 6,184,124 | B1 | 2/2001 | Hasegawa et al. |
| 6,208,271 | B1 * | 3/2001 | Armstrong .................. 341/34 |
| 6,225,814 | B1 | 5/2001 | Oreper et al. |
| 6,313,731 | B1 | 11/2001 | Vance |
| 6,323,840 | B1 | 11/2001 | Steinbrunner |
| 6,331,849 | B1 | 12/2001 | VandenBoom |
| 6,351,205 | B1 | 2/2002 | Armstrong |
| 6,404,323 | B1 | 6/2002 | Schrum et al. |
| 6,531,951 | B1 | 3/2003 | Serban et al. |
| 6,590,177 | B1 * | 7/2003 | Takahashi et al. .......... 200/512 |
| 6,621,004 | B1 * | 9/2003 | Cheynet et al. ............... 174/50 |
| 6,756,555 | B1 * | 6/2004 | Lin ............................ 200/512 |
| 6,794,982 | B1 * | 9/2004 | Inoue et al. .................. 338/47 |
| 6,909,354 | B1 * | 6/2005 | Baker et al. .................. 338/47 |
| 2002/0007677 | A1 | 1/2002 | Coates et al. |
| 2002/0024503 | A1 | 2/2002 | Armstrong |
| 2002/0055384 | A1 | 5/2002 | Armstrong |
| 2002/0104369 | A1 | 8/2002 | Baker et al. |
| 2002/0192939 | A1 | 12/2002 | Sugihara |

* cited by examiner

MINIATURE HIGHLY MANUFACTURABLE MOUSE POINTING DEVICE

BACKGROUND OF THE INVENTION

1. Field of the Invention

The present invention relates to directional input devices particularly for use in portable electronic devices.

2. Background Art

Highly portable electronic devices, such as personal digital assistants, portable telephones, remote controls, and the like, provide increasing functionality to their users. This functionality often accompanies an increased need for information from the user. To fulfill this need, portable electronic devices incorporate mouse pointing sensors that provide directional input using a single finger, often from the same hand that holds the electronic device. In addition, many such mouse pointing sensors provide a magnitude signal in relation to force supplied by the user. This force may be applied through a joystick or a mouse button. Signals generated by such mouse pointing sensors are conditioned and processed by on-board logic to activate a pointer displayed on a graphical user interface either incorporated into the handheld device or separated from the handheld device, such as with a television remote control.

New portable electronic devices must be light, reliable, and inexpensive. This latter requirement dictates a mouse pointing sensor which is both inexpensive and easily manufacturable into the handheld device. In addition, the mouse pointing sensor must be small. The sensor must not require a large footprint on a handheld device printed circuit board. In addition, the sensor must not require significant vertical distance away from the printed circuit board.

One type of sensor used in portable electronic devices operates with a strain gauge stick. Moving the stick creates strain induced changes in resistance. One difficulty with such devices is that the strain induced resistance change creates a small signal, requiring amplification and introducing noise susceptibility. In addition, these devices have a flex circuit tail which requires a connector on the printed circuit board. The sensor is often mechanically mounted to the printed circuit board with screws. Thus, both the device and its manufacture into a portable electronic system is expensive.

Another sensor type is the Force Sensing Resistor™ (FSR). Various FSRs have been disclosed, such as those described in commonly assigned U.S. Pat. Nos. 4,314,227 and 4,314,228, each of which is hereby incorporated by reference in its entirety. Typically, an FSR is composed of three parts: a rigid base, a spacer, and a resistive membrane. The flexible resistive membrane is spaced apart from the base layer by a spacer, which is typically a ring of material around the outer edge of the conductive traces. The spacer is also typically coated with adhesive to hold the device together. The flexible top membrane may be made of a polymer coated on its inner face with semi-conductive or resistive ink, giving the FSR force sensing properties. This ink is described in commonly owned U.S. Pat. Nos. 5,296,837 and 5,302,936, each of which is hereby incorporated by reference in its entirety.

Conductive traces within the FSR are typically arranged in separated interdigitated sets on the base. These traces may be configured in a single zone or, more relevant to the present invention, in multiple zones allowing pointing devices as described in commonly assigned U.S. Pat. No. 5,659,334, which is hereby incorporated by reference in its entirety.

For use in portable electronic devices, the FSR must be connected to sensing and conditioning electronics. One way this may be accomplished is by connecting the FSR to a printed circuit board through a multi-conductor cable. Another way of connecting the FSR to support electronics is to adhere the FSR base directly to a printed circuit board containing the electronics through z-tape. Z-tape is adhesive on both sides and conducts electricity in a direction perpendicular to the tape surface. While either of these methods is effective, both have manufacturing steps and components which are necessary only for mounting purposes. If these components and their associated manufacturing steps could be eliminated, the cost of any system containing such an FSR could be reduced. In addition, the reliability of such a system would be increased.

What is needed is a mouse pointing transducer and a method of manufacturing such a transducer into a portable electronic device that eliminates unnecessary components and requires fewer manufacturing steps without sacrificing transducer performance.

SUMMARY OF THE INVENTION

The present invention decreases the cost and complexity of an electronic mouse pointing device by constructing the device in a manner permitting assembly into user interfaces with industry standard high volume automated manufacturing processes. In addition, the present invention allows input to the pointing transducer to be measured with a minimum of external circuitry and with a minimum of noise susceptibility.

A pointing device for integrating into portable electronic devices is provided. The device includes a bottom substrate having a top face and a bottom face. The top face includes a sensing region with a plurality of interdigitated conductive trace regions. Each trace region includes interdigitated common and sense traces. The bottom substrate defines at least one via through the bottom substrate for each sense trace and the common trace. Each via supports a conductive path from one trace to at least one lead element. The bottom face supports at least one lead element for each sense trace and the common trace. Each lead element is solderable to a printed circuit board. A flexible substrate is constructed from a heat resistant polymer. The flexible substrate has a resistive layer deposited on a bottom side. A raised pedestal is formed on the bottom substrate top face around at least a portion of the sensing region. The pedestal separates the interdigitated conductive traces from the flexible substrate resistive layer. An adhesive spacer layer joins the flexible substrate to the bottom substrate such that the resistive layer is facing the bottom substrate sensing region.

In an embodiment of the present invention, the pointing device includes a force transfer device with a rounded portion and a shaft portion extending therefrom. The rounded portion contacts the flexible substrate top side.

In another embodiment of the present invention, a printed circuit board has a top face upon which is soldered the bottom substrate. A keypad membrane covers the top substrate. The keypad membrane includes a contact portion for contacting the flexible substrate. The keypad membrane may include a user interface portion extending from the contact portion away from the flexible substrate.

In still another embodiment of the present invention, a top substrate is affixed to the flexible substrate. The top substrate defines an access opening through the top substrate and over the sensing region.

In still another embodiment of the present invention, at least one via runs along a side of the bottom substrate between the bottom substrate top side and the bottom substrate bottom side.

In a further embodiment of the present invention, at least one lead element is a conductive trace around each of the at least one via on the bottom substrate bottom face.

A portable user interface including a plurality of keys and a pointing device is also provided. A first substrate supports a plurality of conductive traces. Key switches are affixed to the first substrate. A second substrate is soldered to the first substrate conductive traces. The second substrate has a plurality of contact regions, each contact region including a plurality of spaced apart traces. The spaced apart traces are electrically connected to the first substrate conductive traces. A flexible substrate is spaced above the second substrate. The flexible substrate is coated with a resistive coating on a side facing the contact regions such that, when pressure is applied to the flexible substrate, the flexible substrate deflects onto the second substrate to form a resistive connection between the spaced apart traces in at least one contact region. A keypad membrane covers the flexible substrate and the key switches. The membrane defines a button in a region of the membrane over each of the key switches. The membrane further defines a rounded region for contacting the flexible substrate. The rounded region deflects a portion of the flexible substrate onto at least one contact region based on pressure applied to a side of the keypad membrane opposite of the rounded region.

In an embodiment of the present invention, the dimensional resolution of the second substrate spaced apart traces is substantially finer than the dimensional resolution of the first substrate traces.

In yet another embodiment of the present invention, the second substrate defines a plurality of conducting vias, each via carrying electrical signals between one of the spaced apart traces and one of the first substrate conductive traces. Each via is at least partially surrounded by conducting material on a side of the second substrate opposite of the plurality of contacting regions. The conducting material is soldered to one of the first substrate conductive traces.

In a further embodiment of the present invention, a package encapsulates the second substrate and the flexible substrate. The package defines an opening over the contact regions. A plurality of conductive leads extend from the package. Each lead is solderable to one of the first substrate conductive traces. Each lead is also electrically connected with one of the plurality of spaced apart traces.

A method of making a surface mountable pointing device is also provided. A thin bottom substrate material is formed to have a top surface area of sufficient size to support a plurality of pointing devices. For each pointing device supported, a plurality of through holes is formed in the bottom substrate material. A plurality of sets of sensing conductive traces is formed on the bottom substrate top surface in a sensing region for each pointing device supported. Each set of sensing conductive traces includes two electrically separate interdigitated sensing traces. For each pointing device supported, at least one connecting conductive trace is formed from each sensing conductive trace to and into at least one of the through holes. An insulative material is deposited on the bottom substrate top surface substantially around each sensing region. This insulative material forms a raised pedestal. A high temperature resistant flexible substrate sized to substantially cover the bottom substrate top surface is formed. The flexible substrate is coated with a resistive material on a bottom surface. The flexible substrate bottom surface is adhered to the bottom substrate top surface such that, for each pointing device supported, the resistive material is suspended above the sensing region. The bottom substrate is diced to separate each pointing device.

An encapsulated pointing device for integrating into portable electronic devices is also provided. The pointing device includes a bottom substrate having a top face including a sensing region with a plurality of interdigitated conductive trace regions. Each trace region includes interdigitated common and sense traces. The top face further defines at least one conductive pad electrically connected to each trace. An electrical lead element is in electrical connection with each pad. A raised pedestal is formed on the bottom substrate around at least a portion of the sensing region. A flexible substrate is constructed from a heat resistant polymer. The flexible substrate has a resistive layer deposited on a bottom side. The flexible substrate is attached to the raised pedestal such that the pedestal separates the plurality of interdigitated conductive traces from the flexible substrate resistive layer. A package encapsulates the bottom substrate, the flexible substrate, the raised pedestal and a portion of each electrical lead element. The package defines an opening over the sensing region.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 10*a*–10*g* are processing drawings illustrating manufacturing of a pointing device according to an embodiment of the present invention.

DETAILED DESCRIPTION OF THE PREFERRED EMBODIMENT(S)

Figure 1A:
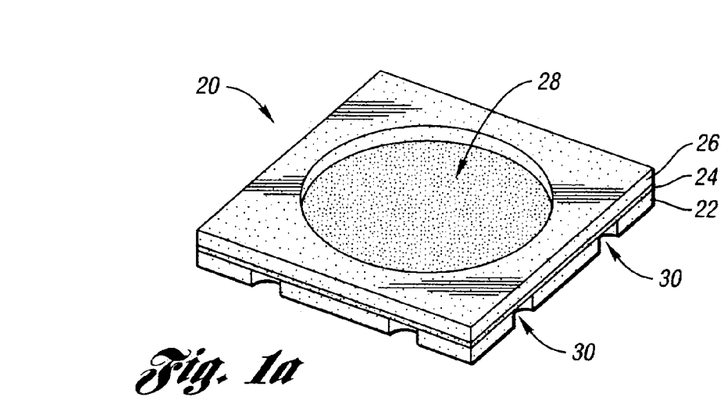
FIGS. 1*a* and 1*b* are top and bottom perspective views, respectively, illustrating a pointing device according to an embodiment of the present invention.
Figure 1B:
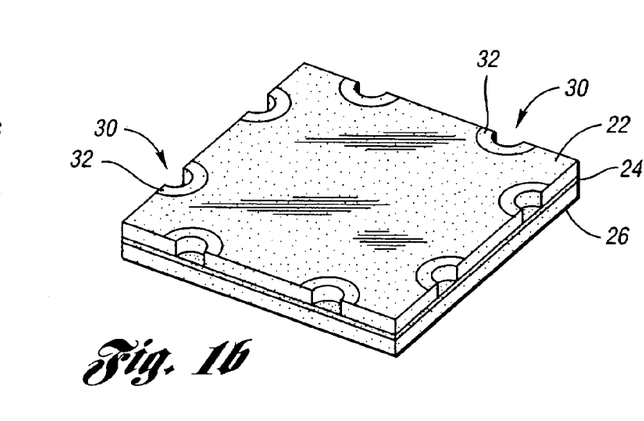

Referring to FIGS. 1a and 1b, top and bottom perspective views, respectively, illustrating a pointing device according to an embodiment of the present invention are shown. A pointing device, shown generally by 20, includes bottom substrate 22, flexible substrate 24 and top substrate 26. Top substrate 26 defines opening 28 allowing flexible substrate 24 to be depressed onto a contact area on bottom substrate 22. In some embodiments of the present invention, top substrate 26 may be eliminated.

Bottom substrate 22 defines a plurality of vias 30 passing through bottom substrate 22. The bottom side of bottom substrate 22 includes annular conductors 32 surrounding the openings for vias 30. The inside of vias 30 are also conductive. Annular conductors 32 may be directly soldered to printed circuit boards receiving pointing device 20. This eliminates the need for connective cabling, connectors, z-tape, and the like. Alternatively, vias 30 may support other types of lead elements such as legs, balls, and the like.

Figure 2:
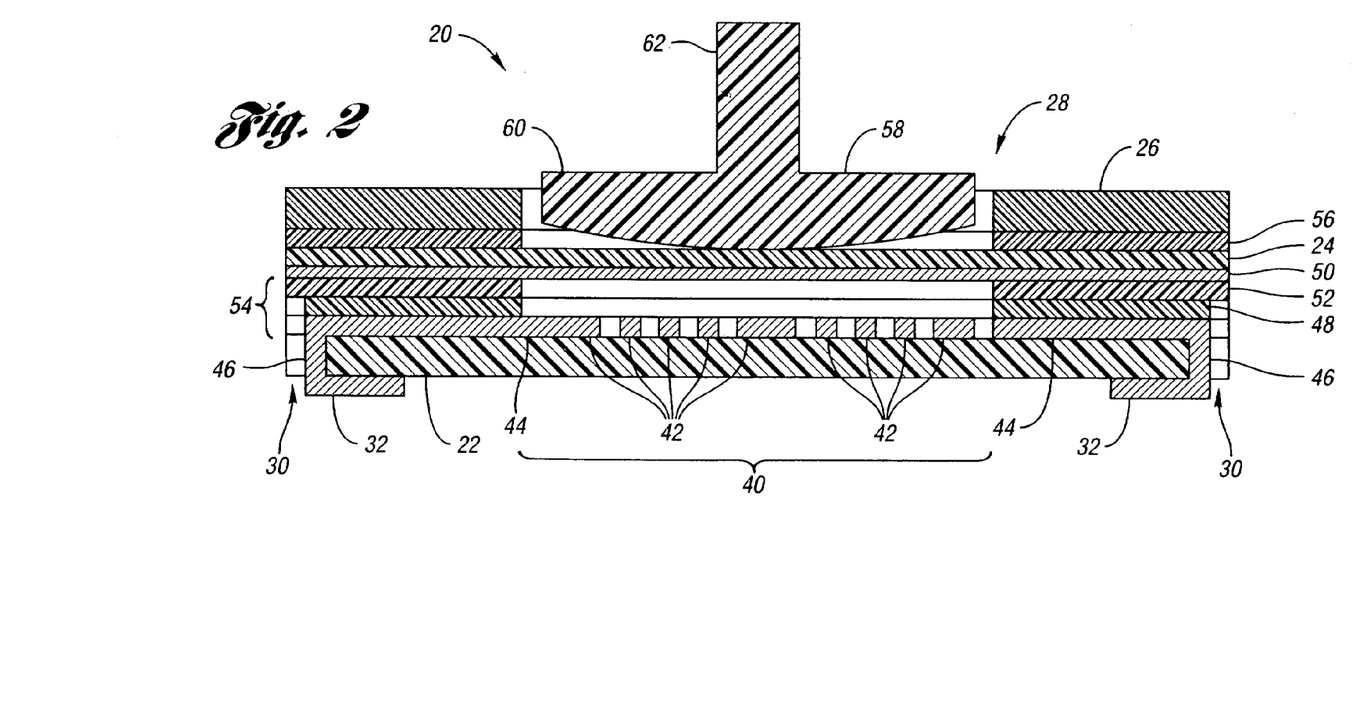
FIG. 2 is a conceptualized cross-sectional diagram illustrating a pointing device according to an embodiment of the present invention.

Referring now to FIG. 2, a conceptualized cross-sectional diagram illustrating a pointing device according to an embodiment of the present invention is shown. The various layers shown in FIG. 2 are not drawn to scale but are illustrated in a manner to better show the construction of pointing device 20.

Bottom substrate 22 defines sensing region 40 to include a plurality of sensing conductive traces 42. As will be illustrated below, traces 42 are interdigitated. Sensing conductive traces 42 are joined by connecting conductive traces 44 to vias 30. Through plating 46 in each via 30 connects connecting conductive traces 44 with lead elements 32.

Soldermask 48 is deposited on the top surface of bottom substrate 22 around at least part of sensing region 40. Soldermask 48 protects connecting conductive traces 44 and provides spacing above sensing conductive traces 42.

Flexible substrate 24 is at least partially covered on a bottom side with resistive layer 50. Preferably, resistive layer 50 is a semiconductive or resistive ink such as is described in U.S. Pat. Nos. 5,296,837 and 5,302,936. This ink may be screen printed onto flexible substrate 24 in at least the region above sensing region 40. Flexible substrate 24 is preferably constructed from a high temperature material such as KAPTON, a polyimide film by DuPont, UPILEX from UBE Industries, Ltd., IMIDEX from Westlake Plastics, and the like. Flexible substrate 24 is assembled to bottom substrate 22 with adhesive layer 52 so that resistive layer 50 faces sensing conductive traces 42 in sensing region 40. Connecting conductive traces 44, Soldermask 48 and adhesive layer 52 form pedestal 54 spacing resistive layer 50 from sensing region 40.

In a preferred embodiment of the present invention, top substrate 26 is affixed to flexible substrate 24 with adhesive layer 56 such that opening 28 is above sensing region 40. Bottom substrate 22 and top substrate 26 are preferably made from a rigid material such as FR4. Adhesive layers 52, 56 are preferably a high temperature adhesive such as B9021-6 EPO-TEK, a b-stage epoxy from Epoxy Technology of Billerica, Mass. This material can be screen printed on both sides of flexible substrate 24 and partially set by exposure to 80° C. for two minutes. Flexible substrate so coated may then be stored until a time when pointing device 20 is assembled. Adhesive layers 52, 56 are then reactivated and further set by exposure to 150° C. for thirty minutes.

In an embodiment of the present invention, pointing device 20 includes force transfer device 58. Force transfer device 58 includes base 60 having a curved bottom portion and a shaft 62 extending from base 60. Directional pressure on shaft 62 rolls base 60 over a portion of flexible substrate 24 in sensing region 40. This causes resistive layer 50 to contact sensing conductive traces 42.

Figure 3:
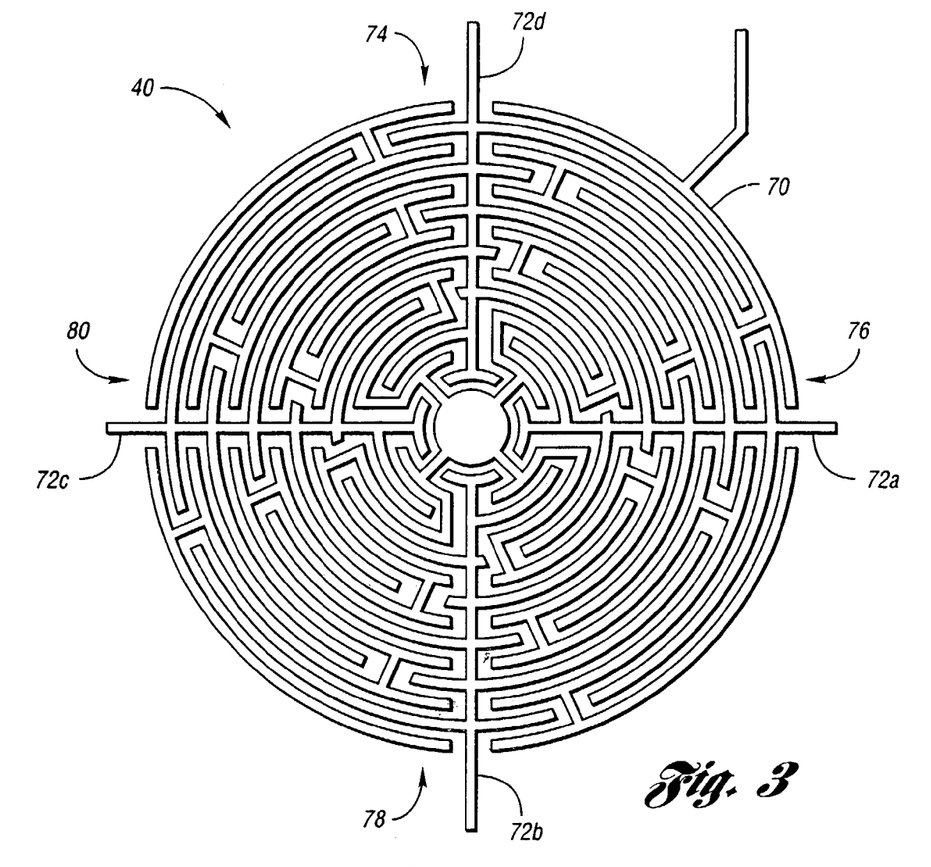
FIG. 3 is a schematic diagram illustrating a sensing region according to an embodiment of the present invention.

Referring now to FIG. 3, a schematic diagram illustrating a sensing region according to an embodiment of the present invention is shown. Sensing region 40 includes common trace 70 and four sense traces 72a, 72b, 72c, and 72d. Common trace 70 is interdigitated with sense traces 72. This creates four overlapping contact regions indicated generally by north region 74, east region 76, south region 78 and west region 80. When resistive layer 50 makes contact with traces 70, 72, a resistive path is formed. Measuring this resistance provides an indication as to the area of resistive layer 50 in contact as well as the location of contact. As will be appreciated by one of ordinary skill in the art, other interdigitated patterns may be used with the present invention to form four or any other number of contact regions.

Figure 4:
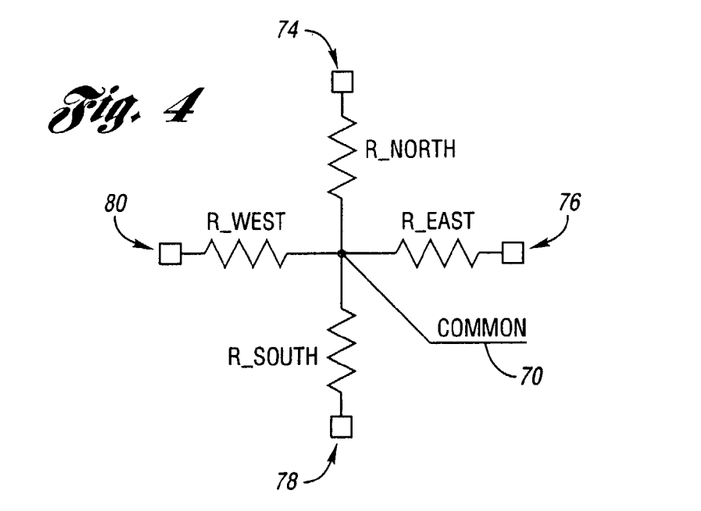
FIG. 4 is a circuit diagram illustrating an equivalent circuit for a sensing region according to an embodiment of the present invention.

Referring now to FIG. 4, a schematic diagram illustrating an equivalent circuit for a sensing region according to an embodiment of the present invention is shown. Each contact region 74, 76, 78, 80 may be represented with a resistance value. For example, north region 74 is modeled with resistor R_North. When no force is applied to flexible substrate 24, these resistances are extremely high. When pressure is applied to flexible substrate 24 such that resistive layer 50 contacts traces 42, a measurable value of resistance is obtained. By scanning each resistance value in turn, the position and force applied to force transfer device 58 can be determined.

Figure 5:
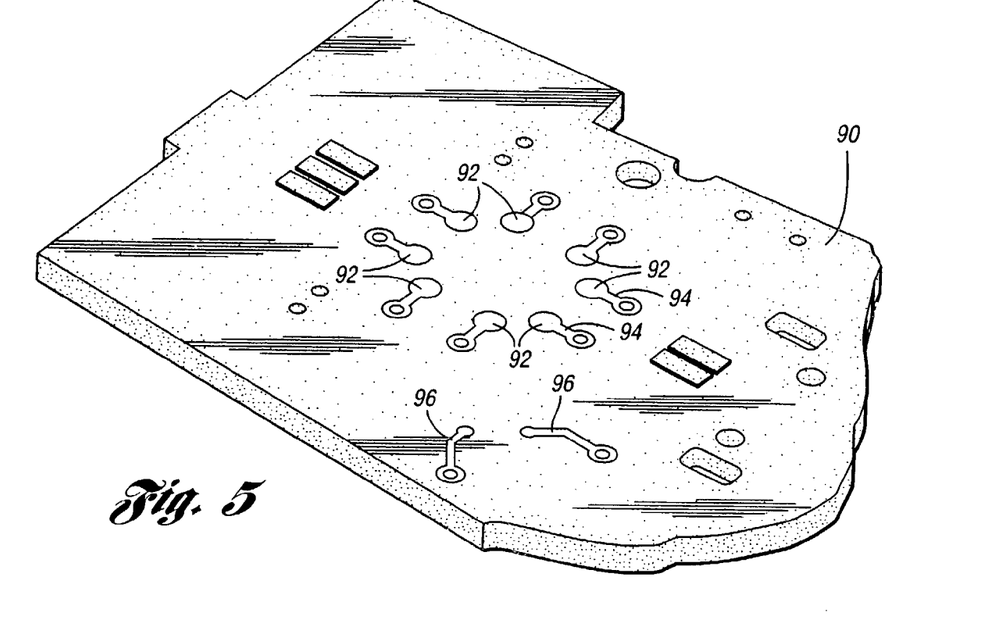
FIG. 5 is a perspective drawing illustrating a printed circuit board for a portable user interface according to an embodiment of the present invention.

Referring now to FIG. 5, a perspective drawing illustrating a printed circuit board for a portable user interface according to an embodiment of the present invention is shown. Printed circuit board 90 includes pads 92 for accepting pointing device 20. Traces 94 lead from pads 92 for connection to electronics preferably on the opposite side of printed circuit board 90. Printed circuit board 90 also includes pads 96 for electrically and mechanically attaching a key switch. Typically, a plurality of such key switch pads 96 are included on printed circuit board 90. Traces on printed circuit board 90, such as traces 94, vary in pitch, trace width and spacing, depending on the application. Typical pitch is 0.008 inches (0.2 mm). Traces 94 are typically covered with soldermask to prevent corrosion and, therefore, no protective plating is required.

Figure 6:
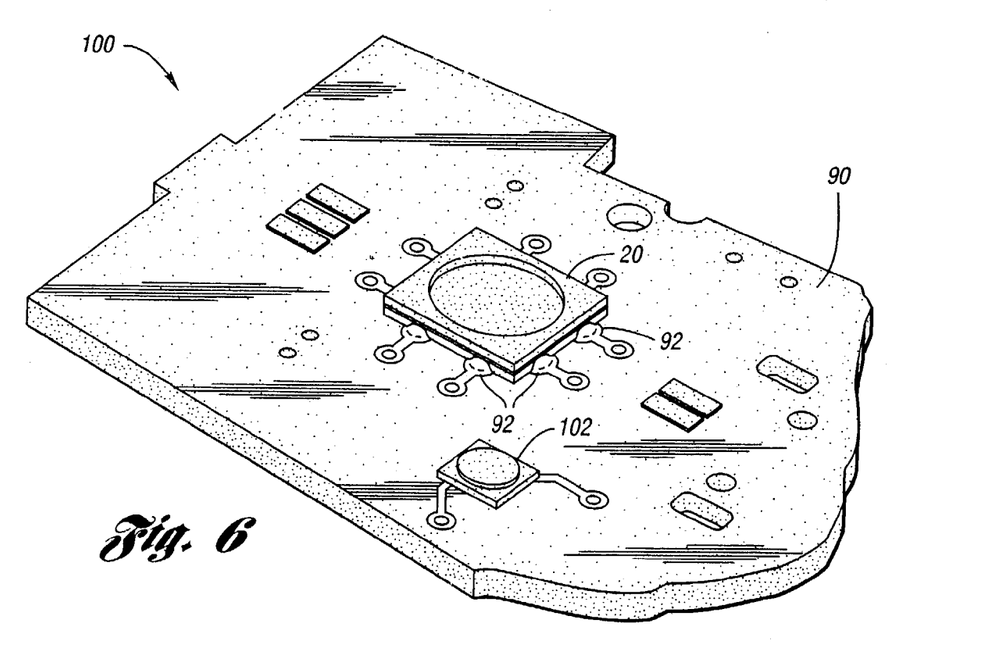
FIG. 6 is a perspective drawing illustrating a printed circuit board assembly for a portable user interface according to an embodiment of the present invention.

Referring now to FIG. 6, a perspective drawing illustrating a printed circuit board assembly for a portable user interface according to an embodiment of the present invention is shown. Printed circuit board assembly, indicated generally by 100, includes printed circuit board 90 onto which has been soldered pointing device 20 and at least one key switch 102. Pointing device 20 is constructed to permit placement with standard automation, such as by a pick-and-place machine. In addition, pointing device 20 is solderable using any standard, mass production soldering technique such as, for example, solder reflow.

The construction and integration of key switches 102 is well known in the art. One type of key switch 102 shorts key switch traces together using a carbon-filled rubber pill. The pill for each key switch is molded into the back of a keypad membrane. Another type of key switch shorts key switch traces together by the temporary collapsing of a metal snap-dome. The metal snap-domes for a plurality of key switches are typically held in a carrier membrane which positions the snap-domes. The membrane includes a cutout for each dome to permit contact of the key switch traces. The keypad membrane fits over the domes. A user depressing a key on the keypad membrane collapses the corresponding dome. Yet another type of key switch is a surface-mountable microswitch. As will be recognized by one of ordinary skill in the art, the present invention integrates with any type of key switch.

Figures 7, 8:
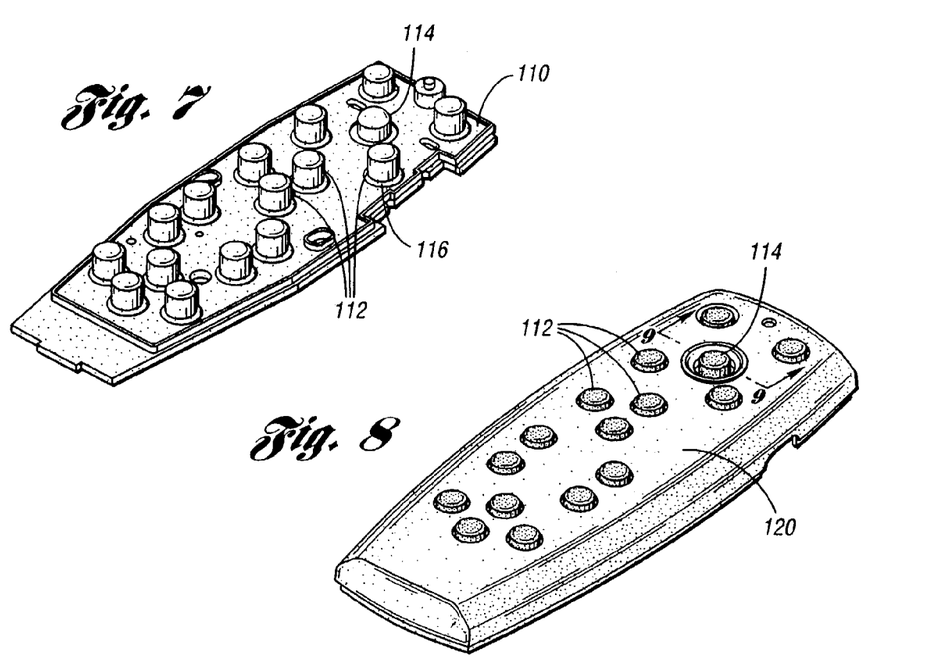
FIG. 7 is a perspective drawing illustrating a keypad membrane for a portable user interface according to an embodiment of the present invention.
FIG. 8 is a perspective drawing illustrating a cover over a keypad membrane for a portable user interface according to an embodiment of the present invention.

Referring now to FIG. 7, a perspective drawing illustrating a keypad membrane for a portable user interface according to an embodiment of the present invention is shown. Keypad membrane 110 includes a plurality of key buttons 112 and pointing interface 114. Each key button 112 is positioned above one key switch 102 on printed circuit board assembly 100. Each key button 112 is formed on keypad membrane 110 with a flexible collar 116 permitting button 112 to move vertically. Depressing button 112 asserts the corresponding key switch 102. Keypad membrane 110 may be made from any suitable flexible material such as, for example, silicone rubber. In the example shown, keypad membrane 110 is about 0.030 inches (0.75 mm) thick in regions away from key buttons 112 and pointing interface 114. However, the thickness of keypad membrane may vary widely depending on the application.

Referring now to FIG. 8, a perspective drawing illustrating a cover over a keypad membrane for a portable user interface according to an embodiment of the present invention is shown. Cover 120 defines holes for accessing key buttons 112 and pointing interface 114. Cover 120 may be formed from any rigid or semi-rigid material such as, ABS plastic, polycarbonate, blends of these, and the like. Cover 120 may attach to a mating back cover, not shown.

Figure 9:
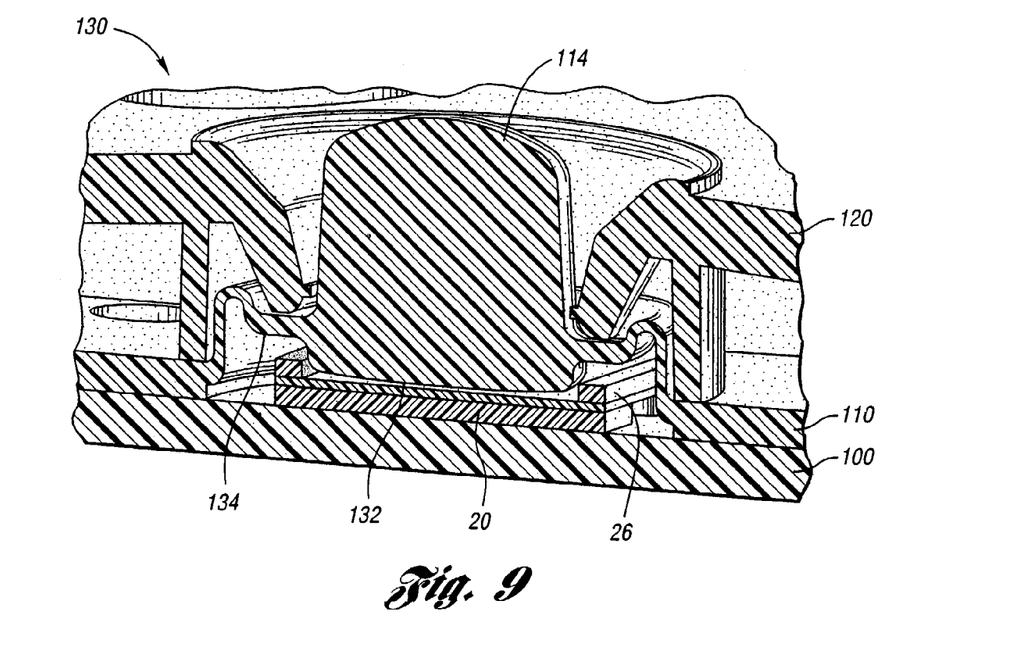
FIG. 9 is a cross-sectional drawing of a portable user interface according to an embodiment of the present invention.

Referring now to FIG. 9, a cross-sectional drawing of a portable user interface according to an embodiment of the present invention is shown. A portable user interface, shown generally by 130, includes pointing device 20. Pointing device 20, shown without the detail illustrated in FIG. 2, is soldered to printed circuit board 100. In the embodiment shown, pointing device 20 includes top substrate 26. Keypad membrane 110 is positioned on printed circuit board assembly 100 such that pointing interface 114 is positioned over pointing device 20. Cover 120 holds keypad membrane 110 to printed circuit board assembly 100. There may also be a bottom protective cover underneath printed circuit board assembly 100.

Pointing interface 114 includes rounded contact portion 132 fitting withing the circular opening in top substrate 26. Top substrate 26 assists in properly aligning pointing interface 114 with pointing device 20. Pointing interface 114 is suspended by flexible annular collar 134 which joins pointing interface 114 with the remainder of keypad membrane 110.

Referring now to FIGS. 10a–10g, processing drawings illustrating manufacturing of pointing devices according to an embodiment of the present invention are shown. Pointing devices of the present invention are easily mass produced. The following discussion describes simultaneously manufacturing one hundred pointing devices. As will be recognized by one of ordinary skill in the art, this method may be easily modified to manufacture any number of pointing device.

A 0.005 inch (0.13 mm) polyimide sheet approximately 4.72 inches (120 mm) square is silk screened on one side with a resistive or semiconductive ink. Both sides are then screened with a b-stage adhesive approximately 0.001 inch (0.025 mm) thick. The adhesive is applied to regions outside of the contact area for each supported device. A mask, such as illustrated for the soldermask in FIG. 10d, may be used for this purpose. This adhesive may be partially cured allowing treated polyimide sheets to be stacked for later use.

Figure 10A:
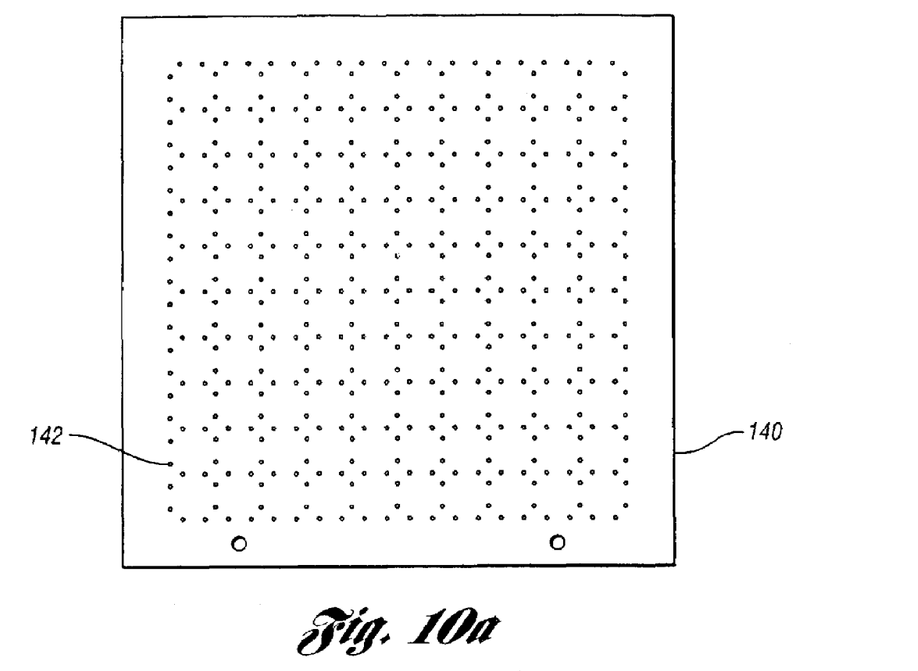

FIG. 10a illustrates the outline and drill pattern for first board 140. First board 140 is preferably FR4 having a thickness of 0.020 inches (0.508 mm). First board 140 is 4.72 inches (120.0 mm) along each side. A plurality of holes, one of which is indicated by 142, are formed in first board 140. These holes become vias that run along the side of each pointing device.

Figure 10B:
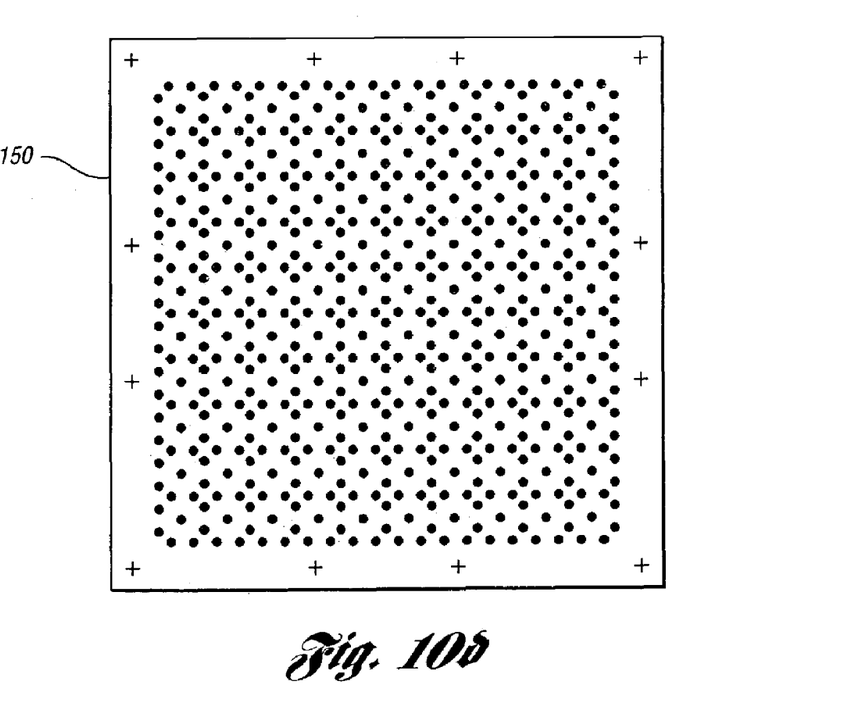
Figure 10C:
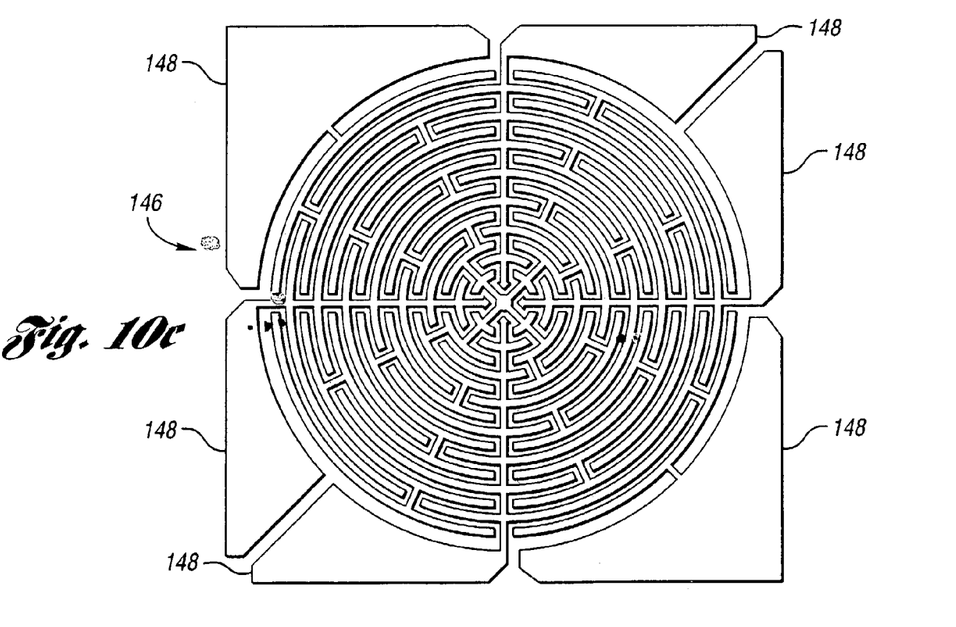

FIG. 10b illustrates front copper pattern 144 for first board 140. Front copper pattern 144 defines the contact area for each pointing device. The pattern for one device, referenced generally by 146, is shown in FIG. 10c. The center, circular area is sensing region 40 comprising a plurality of interdigitated sensing traces, each trace connected to at least one outer pad 148. Copper thickness is approximately 0.0005 inches (0.013 mm) to be plated with approximately 100 microinches (2.5 μm) of nickel then approximately 30 microinches (0.8 μm) of gold. Gold is added to increase durability and to protect against copper oxidation. Traces within sensing region 40 have a minimum space-and-trace of 0.005 inches (0.127 mm). One advantage of the present device is that the fine trace pitch and gold plating need only be applied to the small sensing region 40 and not to the entire printed circuit board upon which the pointing device will be soldered. This allows the supporting printed circuit board to use coarser trace pitch and unplated traces. As will be recognized by one of ordinary skill in the art, other materials may be used for traces within contact area 40 such as, for example, carbon ink.

FIG. 10d illustrates rear copper pattern 150 for first board 140. Rear copper pattern 150 places copper around and through each hole 142 in first board 140. In addition, an annular portion of copper is deposited in a region that will become the center of the bottom of each pointing device to provide additional mechanical support.

Figure 10E:
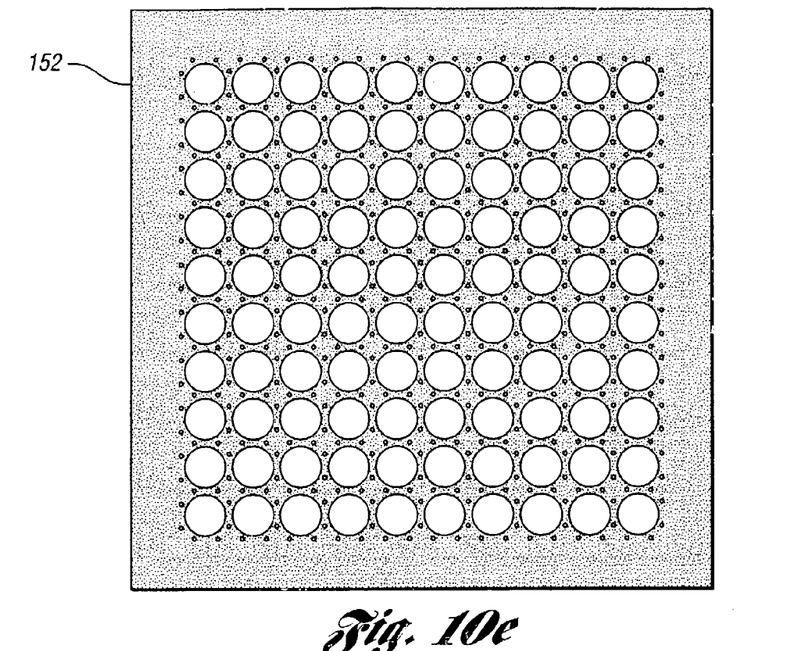

FIG. 10e illustrates soldermask pattern 152 for the front side of first board 140. Soldermask, as illustrated by pattern 152, is applied to the front side of first board 140 to provide insulation outside of sensing region 40 and to form pedestal 54. Soldermask may be deposited to a thickness of 0.001 inches (0.03 mm).

Figure 10F:
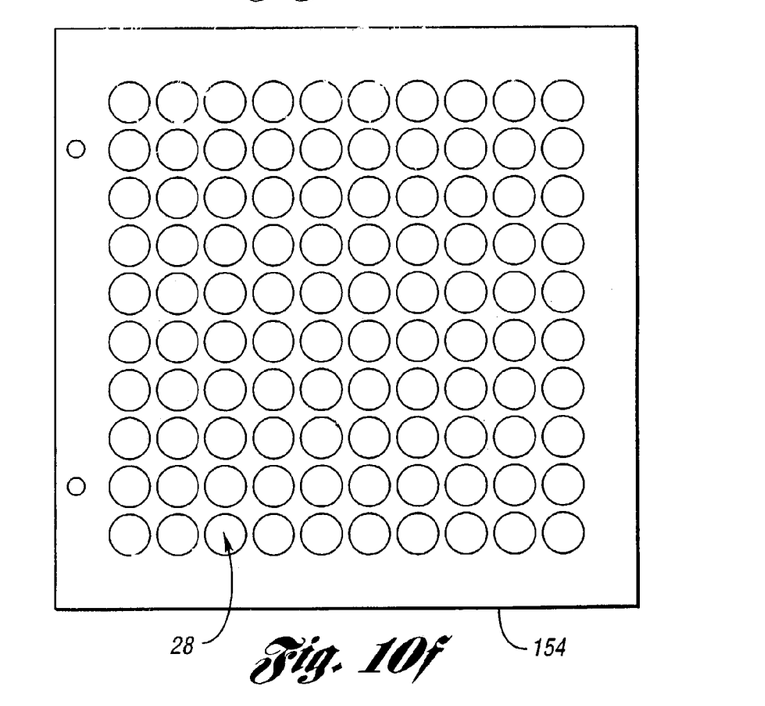
Figure 10G:
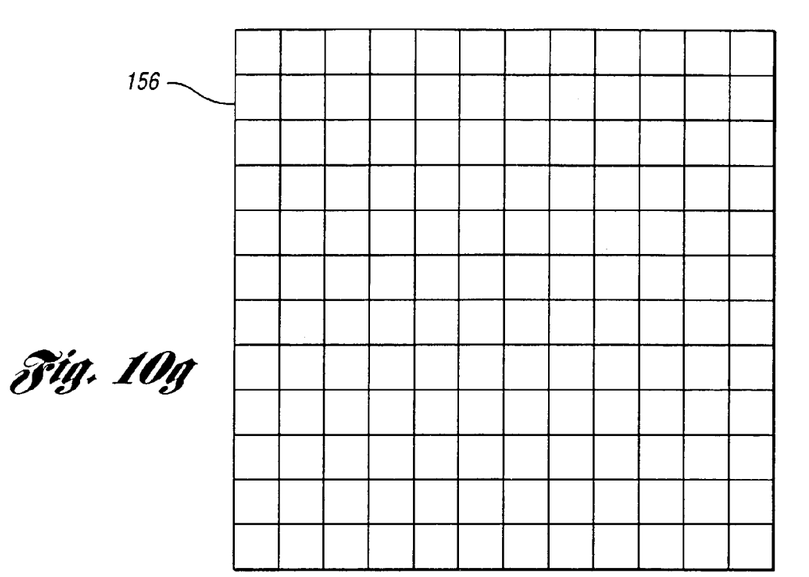

FIG. 10f illustrates second board 154. Optional second board 154 is preferably made from 0.020 inch (0.51 mm) thick FR4 in the same size as first board 140. Second board 154 defines opening 28 for each pointing device 20.

To assemble pointing device 20, the polyimide film is placed on first board 140 with the resistive or semiconductive side facing the top of first board 140. Second board 154 is then placed on the opposite side of the polyimide film. Heat is applied to set the b-stage adhesive. The assembly is diced as indicated by dice pattern 156 in FIG. 10g to produce one hundred pointing devices 20. In the embodiment described, dicing cuts plated vias 142 in half to create edge connections between the front and back sides of first board 140.

Figure 11A:
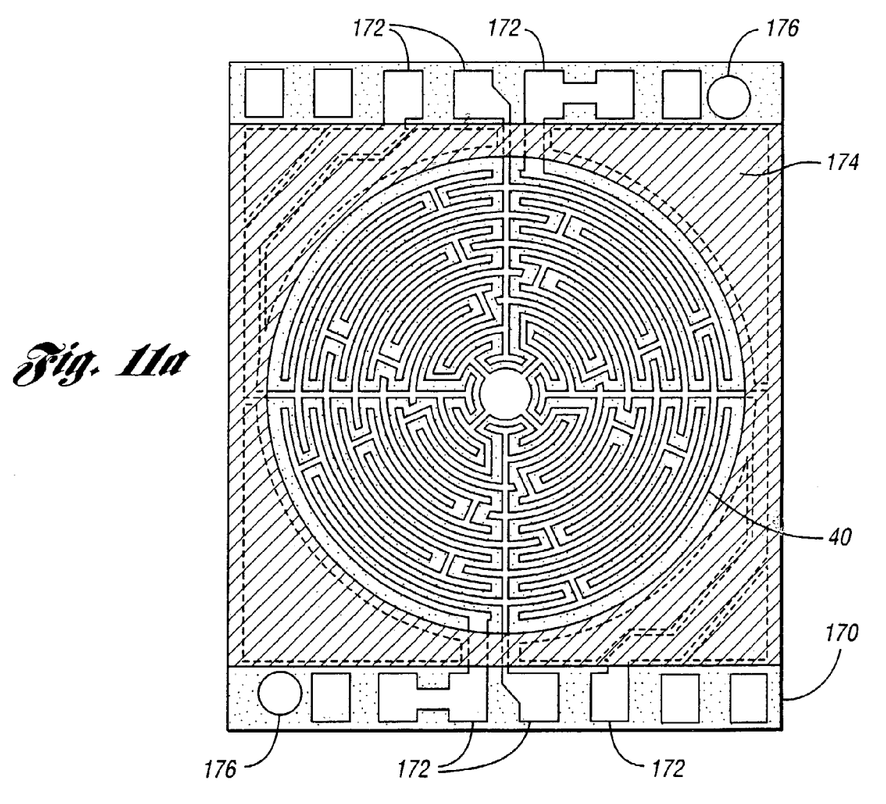
FIGS. 11*a*–11*d* are drawings illustrating manufacturing of an encapsulated pointing device according to an embodiment of the present invention.

Referring now to FIGS. 11a–11d, drawings illustrating manufacturing of an encapsulated pointing device according to an embodiment of the present invention are shown. A plurality of interdigitated sensing traces are formed in sensing region 40 on substrate 170 as illustrated in FIG. 11a. These traces connect to pads 172 along at least one edge of substrate 170. Pads 172 may be on the same side as sensing region 40, as illustrated in FIG. 11a, or maybe on the opposite side of substrate 170. Soldermask 174, illustrated by cross-hatching in FIG. 11a, is deposited around sensing region 40 leaving pads 172 exposed. Soldermask 174 protects and insulates conductive traces as well as forms pedestal 54. Soldermask 174 may also be formed in the center of sensing region 40 to provide support for any force transfer device 58. Substrate 170 may define register holes 176 to assist in manufacturing and packaging.

Figure 11B:
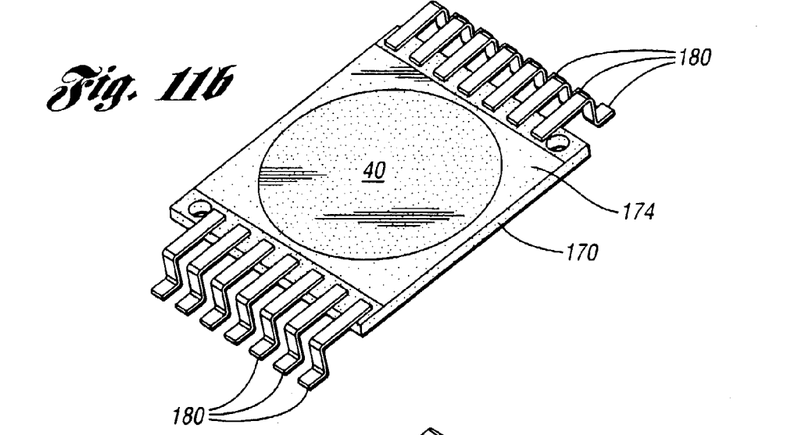

FIG. 11b illustrates a conceptualized perspective view of substrate 170 with leads 180 attached to pads 172. Leads 180 may be attached using a variety of techniques such as soldering, vibration welding, and the like. In the embodiment shown, not all leads 180 carry signals from sensing region 40.

Figure 11C:
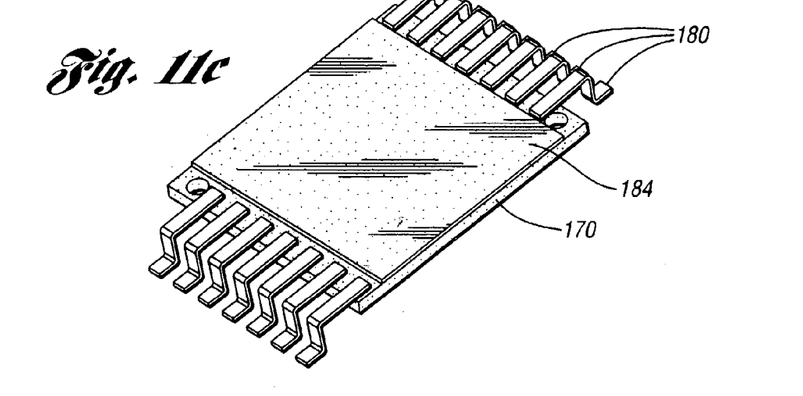

FIG. 11c illustrates substrate 170 onto which flexible film 184 has been attached. Flexible film 184 includes a resistive or semiconductive area which faces sensing region 40. When no pressure is applied to film 184, this resistive or semiconductive surface does not contact sensing region 40. However, when pressure is applied to film 184, the resistive or semiconductive surface interconnects interdigitated traces within sensing region 40. This creates resistive paths that can be measured through leads 180.

Figure 11D:
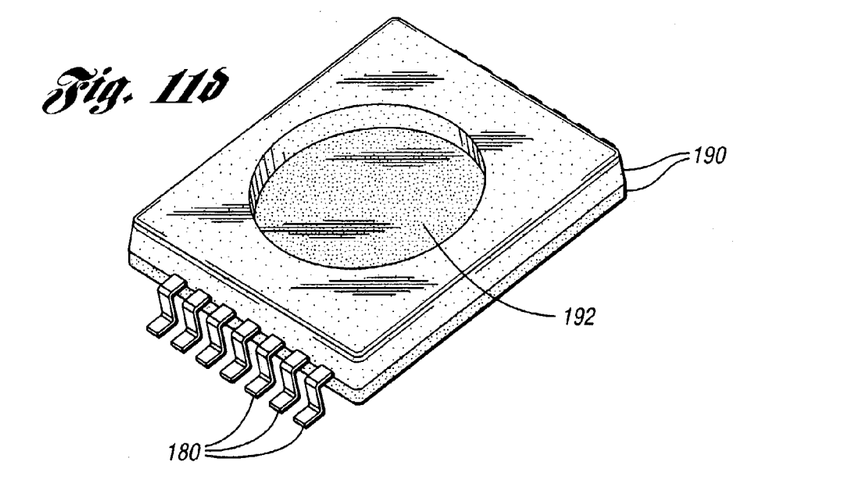

FIG. 11d illustrates encapsulation 190 covering substrate 170 and portions of leads 180 and film 184. Encapsulation 190 defines opening 192 above sensing region 40. This provides access to a force transfer device 58. Leads 180 may now be soldered to a printed circuit board using any standard soldering technique.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pointing device for integrating into portable electronic devices comprising:
   a bottom substrate having a top face and a bottom face, the top face including a sensing region comprising a plurality of interdigitated conductive trace regions, each trace region including interdigitated common and sense traces, the bottom substrate defining at least one via through the bottom substrate for each sense trace and the common trace, each via supporting a conductive path from one trace to at least one lead element, the bottom face supporting at least one lead element for each sense trace and the common trace, each lead element solderable to a printed circuit board;
   a flexible substrate constructed from a heat resistant polymer, the flexible substrate having a resistive layer deposited on a bottom side;
   a raised pedestal formed on the bottom substrate top face around at least a portion of the sensing region, the pedestal separating the plurality of the interdigitated conductive traces from the flexible substrate resistive layer; and
   an adhesive spacer layer joining the flexible substrate to the bottom substrate such that the resistive layer is facing the bottom substrate sensing region.

2. A pointing device as in claim 1 further comprising a force transfer device having a rounded portion and a shaft portion extending from the rounded portion, the rounded portion operative to contact a top side of the flexible substrate.

3. A pointing device as in claim 1 wherein the plurality of interdigitated conductive trace regions is four trace regions.

4. A pointing device as in claim 1 further comprising:
   a printed circuit board having a top face upon which is soldered the bottom substrate; and
   a keypad membrane covering the top substrate, the keypad membrane including a contact portion operative to contact the flexible substrate.

5. A pointing device as in claim 4 further comprising a user interface portion on the keypad membrane, the user interface portion extending from the contact portion away from the flexible substrate.

6. A pointing device as in claim 1 further comprising a top substrate affixed to the flexible substrate, the top substrate defining an access opening through the top substrate and over the sensing region.

7. A pointing device as in claim 1 wherein at least one via runs along a side of the bottom substrate between the bottom substrate top side and the bottom substrate bottom side.

8. A pointing device as in claim 1 wherein the at least one lead element is a conductive trace around each of at least one via on the bottom substrate bottom face.

9. A portable user interface including a plurality of keys and a pointing device comprising:
   a first substrate supporting a plurality of conductive traces;
   a plurality of key switches affixed to the first substrate;
   a second substrate soldered to the first substrate conductive traces, the second substrate having a plurality of contact regions, each contact region including a plurality of spaced apart traces, the plurality of spaced apart traces electrically connected to the first substrate conductive traces;
   a flexible substrate spaced above the second substrate, the flexible substrate coated with a resistive coating on a side facing the contact regions such that, when pressure is applied to the flexible substrate, the flexible substrate deflects onto the second substrate to form a resistive connection between the spaced apart traces in at least one contact region; and
   a keypad membrane covering the flexible substrate and the key switches, the membrane defining a button in a region of the membrane over each of the key switches, the membrane further defining a rounded region for contacting the flexible substrate, the rounded region deflecting portions of the flexible substrate onto at least one contact region based on pressure applied to a side of the keypad membrane opposite of the rounded region.

10. A portable user interface as in claim 9 further comprising a cover defining a plurality of openings, the cover covering the keypad membrane such that each button on the keypad membrane extends through one cover opening, the cover defining an additional opening through which pressure may be applied to the keypad membrane on the opposite side from the rounded region.

11. A portable user interface as in claim 9 wherein the keypad membrane further defines a button for deflecting the rounded region, the button formed on the keypad membrane on a side opposite from the rounded region.

12. A portable user interface as in claim 9 further comprising a third substrate between the flexible substrate and the keypad membrane, the third substrate defining an opening through which the keypad membrane rounded region contacts the flexible substrate.

13. A portable user interface as in claim 9 further comprising an adhesive joining the second substrate and the flexible substrate in a spaced apart manner.

14. A portable user interface as in claim 9 further comprising a raised pedestal formed on the second substrate, the raised pedestal separating the second substrate spaced apart traces from the flexible substrate resistive coating when pressure is not applied to the flexible substrate.

15. A portable user interface as in claim 9 wherein the dimensional resolution of the second substrate spaced apart traces is substantially finer than the dimensional resolution of the first substrate traces.

16. A portable user interface as in claim 9 wherein the second substrate defines a plurality of conducting vias through the second substrate, each via carrying electrical signals between one of the spaced apart traces and one of the first substrate conductive traces.

17. A portable user interface as in claim 16 wherein each via is at least partially surrounded by conducting material on a side of the second substrate opposite of the plurality of contact regions, the conducting material soldered to one of the first substrate conductive traces.

18. A portable user interface as in claim 9 further comprising a package encapsulating the second substrate and the flexible substrate, the package defining an opening over the contact regions.

19. A portable user interface as in claim 18 further comprising a plurality of conductive leads extending from the package, each lead solderable to one of the first substrate conductive traces, each lead electrically connected with one of the plurality of spaced apart traces.

20. A method of making a surface mountable pointing device comprising:
   forming a thin bottom substrate material to have a top surface area of sufficient size to support a plurality of pointing devices;
   for each pointing device supported, forming a plurality of through holes in the bottom substrate material;
   for each pointing device supported, forming on the bottom substrate top surface a plurality of sets of sensing conductive traces in a sensing region, each set of sensing conductive traces including at least two electrically separate interdigitated sensing traces;
   for each pointing device supported, forming at least one connecting conductive trace from each sensing conductive trace to and into at least one of the through holes;
   depositing an insulative material on the bottom substrate top surface substantially around each sensing region, the insulative material forming a raised pedestal;
   forming a high temperature resistant flexible substrate sized to substantially cover the bottom substrate top surface, the flexible substrate coated with a resistive material on a bottom surface;
   adhering the flexible substrate bottom surface to the bottom substrate top surface such that, for each pointing device supported, resistive material is suspended above the sensing region; and
   dicing the bottom substrate to separate each pointing device.

21. A method of forming a surface mountable pointing device as in claim 20 further comprising:
   forming a thin top substrate material to have a bottom surface area substantially the same as the bottom substrate top surface area;
   forming a sensing opening in the top substrate material for each pointing device supported;
   adhering the top substrate bottom surface to the flexible substrate such that the sensing opening is above the sensing region for each pointing device supported; and
   dicing the top substrate as the bottom substrate is diced.

22. A method of forming a surface mountable pointing device as in claim 20 further comprising forming at least one conductive terminal for at least one through hole, each conductive terminal facilitating soldering of the pointing device to a printed circuit board.

23. A method of forming a surface mountable pointing device as in claim 20 wherein dicing cuts through at least one through hole such that the through hole forms a via along a side of the pointing device normal to the bottom substrate top surface.

24. A method of forming a surface mountable pointing device as in claim 20 further comprising:
   constructing a printed circuit board for receiving a plurality of key switches;
   forming a plurality of printed circuit board traces on the printed circuit board; and
   soldering the bottom substrate to the plurality of traces on the printed circuit board.

25. A method of forming a surface mountable pointing device as in claim 24 further comprising:
   forming a keypad membrane having a plurality of key buttons and a pointing interface, the pointing interface having a contacting portion on a bottom side of the keypad membrane and a raised area on a top side of the keypad membrane opposite the contacting portion; and
   positioning the keypad membrane over the printed circuit board such that each key button activates a key switch and such that the contacting portion of the keypad membrane is positioned above the flexible substrate.

26. A method of forming a surface mountable pointing device as in claim 24 wherein the thickness of the bottom substrate is substantially less than the thickness of the printed circuit board.

27. A method of forming a surface mountable pointing device as in claim 24 wherein the pitch of the sensing conductive traces is substantially finer than the pitch of the printed circuit board traces.

28. A method of forming a surface mountable pointing device as in claim 20 further comprising applying a high temperature adhesive to adhere the flexible substrate bottom surface to the bottom substrate top surface.

29. A method of forming a surface mountable pointing device as in claim 20 wherein the plurality of sets of sensing conductive traces is four sets of conductive traces, each set sharing a common trace.

30. A pointing device for integrating into portable electronic devices comprising:
   a bottom substrate having a top face and a bottom face, the top face including a sensing region comprising a plurality of interdigitated conductive trace regions, each trace region including interdigitated common and sense traces, the top face defining at least one conductive pad electrically connected to each trace;
   an electrical lead element in electrical connection with each pad;
   a flexible substrate constructed from a heat resistant polymer, the flexible substrate having a resistive layer deposited on a bottom side;
   a raised pedestal formed on the bottom substrate around at least a portion of the sensing region, the pedestal separating the plurality of the interdigitated conductive traces from the flexible substrate resistive layer;
   an adhesive spacer layer joining the flexible substrate to the bottom substrate such that the resistive layer is facing the bottom substrate sensing region; and
   a package encapsulating the bottom substrate, the flexible substrate, the raised pedestal, the adhesive spacer layer and a portion of each electrical lead element, the package defining an opening over the sensing region.

* * * * *